United States Patent
Forehand

(10) Patent No.: US 7,298,572 B2
(45) Date of Patent: Nov. 20, 2007

(54) FLY HEIGHT ADJUSTED SWEEP CYCLE FOR A DISC DRIVE

(75) Inventor: Monty A. Forehand, Yukon, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 1126 days.

(21) Appl. No.: 10/057,277

(22) Filed: Jan. 25, 2002

(65) Prior Publication Data

US 2003/0053242 A1    Mar. 20, 2003

Related U.S. Application Data

(60) Provisional application No. 60/310,319, filed on Aug. 6, 2001.

(51) Int. Cl.
 G11B 21/02    (2006.01)
 G11B 5/596    (2006.01)

(52) U.S. Cl. ..................... 360/75; 360/78.08
(58) Field of Classification Search .................... None
 See application file for complete search history.

(56) References Cited

U.S. PATENT DOCUMENTS

| | | | |
|---|---|---|---|
| 4,384,311 A * | 5/1983 | McNeil ..................... 360/128 |
| 4,510,541 A * | 4/1985 | Sasamoto ................ 360/97.02 |
| 5,351,156 A * | 9/1994 | Gregory et al. ............ 360/74.1 |
| 5,515,219 A | 5/1996 | Ihrke et al. |
| 5,624,581 A | 4/1997 | Ihrke et al. |
| 5,793,553 A * | 8/1998 | Smith ........................ 360/74.1 |
| 5,832,763 A | 11/1998 | Girard |
| 5,832,764 A | 11/1998 | Girard |
| 5,859,738 A * | 1/1999 | Forehand et al. ............. 360/75 |
| 5,863,237 A | 1/1999 | Felts et al. |
| 5,901,001 A | 5/1999 | Meyer et al. |
| 5,991,114 A | 11/1999 | Huang et al. |
| 6,057,975 A | 5/2000 | Yaeger et al. |
| 6,072,151 A | 6/2000 | Jurgenson et al. |
| 6,160,683 A | 12/2000 | Boutaghou |
| 6,296,552 B1 | 10/2001 | Boutaghou et al. |
| 6,760,174 B2 * | 7/2004 | Forehand ..................... 360/53 |
| 2001/0045108 A1 | 11/2001 | Lewis et al. |

* cited by examiner

Primary Examiner—K. Wong
(74) Attorney, Agent, or Firm—Fellers, Snider, et al.

(57) ABSTRACT

A method of reducing read/write head wear and disc wear through controlling fly height of the read/write head to improve reliability of a disc drive is disclosed. Absent data transfer operations, a fly height adjusted sweep cycle routine executes a sweep cycle sub-routine that positions the read/write head at an inner most data track, lowers the fly height of the read/write head and performs a seek to the outer most data track to sweep debris from a recording surface and then raises the fly height above an operating fly height for the read/write head, oscillates the read/write head to dislodge debris accumulated on the read/write head and holds the read/write head at the raised fly height while awaiting a new data transfer operation.

20 Claims, 5 Drawing Sheets

FLY HEIGHT ADJUSTED SWEEP CYCLE FOR A DISC DRIVE

RELATED APPLICATIONS

This application claims priority to U.S. Provisional Application No. 60/310,319 filed Aug. 6, 2001, entitled Error Recovery and Reliability Features Using Active Fly Height Control In A Disc Drive.

FIELD OF THE INVENTION

This invention relates generally to the field of magnetic data storage devices, and more particularly, but not by way of limitation, to improving reliability for a data storage device.

BACKGROUND

Disc drives are used for data storage in modern electronic products ranging from digital cameras to computer systems and networks. A typical disc drive includes a head-disc assembly (HDA) housing the mechanical portion of the drive, and a printed circuit board assembly (PCBA), attached to the head-disc assembly. The printed circuit board assembly controls operations of the head-disc assembly and provides a communication link between the head-disc assembly and a host device served by the disc drive.

Typically, the head-disc assembly has a disc with a recording surface rotated at a constant speed by a spindle motor assembly and a head stack assembly positionably controlled by a closed loop servo system. The head stack assembly supports a read/write head that writes data to and reads data from the recording surface. Disc drives using a magneto resistive read/write head typically use an inductive element, or writer, to write data to the information tracks and a magnetoresistive element, or reader, to read data from the information tracks during drive operations.

One type of data recorded to and read from the information tracks is servo data. Servo data, including a physical track identification portion (also referred to as a servo track number or physical track number), written to the recording surface define each specific physical track of a number of physical tracks written on the recording surface. A servo track writer is traditionally used in writing a predetermined number of servo tracks to each recording surface during the manufacturing process. The servo tracks are used by the closed loop servo system for controlling the position of the read/write head relative to the recording surface during disc drive operations.

High performance disc drives achieve areal bit densities in the range of several gigabits per square centimeter (Gbits/cm$^2$). Higher recording densities can be achieved by increasing the number of bits per centimeter stored along each information track, and/or by increasing the number of tracks per centimeter written across each recording surface. Capacity increases gained through increasing the bits per centimeter stored on each track generally requires improvements in the read/write channel electronics to enable data to be written to and subsequently read from the recording surface at a correspondingly higher frequency. Capacity increases gained by increasing the number of tracks per centimeter on each recording surface generally require improvements in servo control systems, which enable the read/write head to be more precisely positioned relative to the information tracks.

Signal loss in reading data from an information track in a disc drive is directly proportional to the distance the read/write head is from the information track and the wavelength of the signal. Often, a reduction in an operating fly height of the read/write head accompanies density increases through increased bits per centimeter along the information track. The term operating fly height means a distance, determined for a disc drive by design, the read/write head is spaced from the disc surface to achieve an optimum read/write performance for the head media combination within a disc drive of a particular design. An abrupt reduction in the operating fly height, that may occur, for example, by encountering an asperity event, for disc drives using a magnetoresistor in the reader portion of the read/write head increases the difficulty in recovering data.

An effect of an asperity event on the magnetoresistor and the resulting response of the read channel are well known. An asperity event is characterized by a sudden increase in amplitude of the read signal relative to a normal signal baseline, followed by a decaying portion that lasts for about two microseconds. The portion of the readback signal corresponding to the thermal asperity will generally be sufficiently distorted to prevent proper decoding by the read circuit.

The read circuit and the servo circuit for both training and decoding purposes rely on a normal signal baseline. Excursions of the read signal from the normal signal baseline trigger a response by the read/write channel electronics to decrease the gain of the automatic gain control portion of the read channel, causing an inability of the read circuit and the servo circuit to properly decode the readback signal. Accordingly, monitoring the amplitude of the read signal for sudden increases in amplitude beyond the normal signal baseline followed by a data error provides a convenient means for detecting an asperity event. For reference, additional discussions concerning detection of an asperity event are provided in U.S. Pat. No. 5,995,313 issued Nov. 30, 1999 to Dakroub and U.S. Pat. No. 6,043,946 issued Mar. 28, 2000 to Genheimer et al, both assigned to the assignee of the present invention.

Data errors also can come about due to a variety of temperature, voltage, and other margin conditions present during a write operation that weaken the state of the recorded data. During a read operation those same conditions may have the effect of weakening the ability of the reader to read previously recorded data. In either case, data errors reduce the ability of the disc drive to reliably read previously recorded data.

With reduced fly heights of the read/write head that typically accompany increased liner bit density, debris generated during disc drive operations that settles on the recording surface, when encountered, presents wear problems for the active elements of the read/write head. Wear problems also can occur during extended periods of data transfer inactivity while the spindle motor is spinning by impacting debris and by windage friction. An erosion or wear of the active elements of the read/write head reduces the ability of the disc drive to reliably read and write data to the recording surface, which is a reduction in the reliability of the disc drive.

Therefore, challenges remain and needs persist for means of reducing wear of the active elements of the read/write head to improve disc drive reliability. It is to this and other features and advantages set forth herein that embodiments of the present invention are directed.

SUMMARY OF THE INVENTION

As exemplified by preferred embodiments, the present invention provides for improving reliability of a data storage device by incorporating a fly height adjusted sweep cycle routine into the data storage device. The fly height adjusted sweep cycle routine utilizes steps for reducing wear between the disc and the read/write head of the data storage device.

The fly height adjusted sweep cycle routine is activated when the data storage device is unoccupied with data transfer operations. In other words, detecting an idle condition of the data storage device activates the fly height adjusted sweep cycle routine. Upon activation the fly height adjusted sweep cycle routine begins by raising the fly height of the read/write head to a maximum setting. Once at the maximum setting, the fly height adjusted sweep cycle routine executes a sweep cycle sub-routine. Following the sweep cycle sub-routine the fly height adjusted sweep cycle routine lowers the fly height of the read/write head to a data transfer fly height upon receipt of a seek command.

These and various other features and advantages, which characterize the present invention, will be apparent from a reading of the following detailed description and a review of the associated drawings.

DETAILED DESCRIPTION

Figure 1:
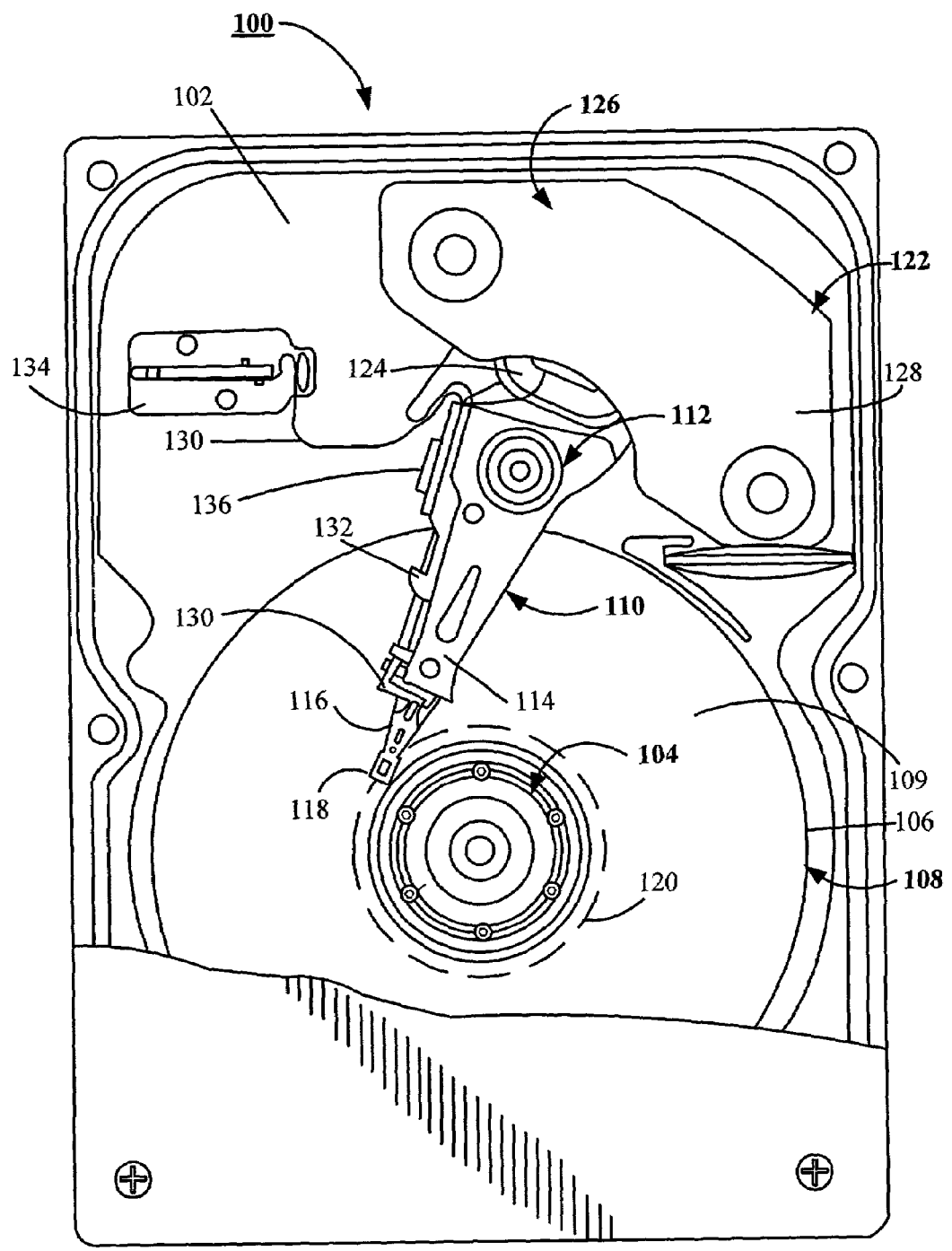
FIG. 1 is a top plan view of a disc drive incorporating an error recovery routine and a fly height adjusted sweep cycle routine to improve reliability of the disc drive.

Referring to the drawings in general, and more particularly to FIG. 1, shown therein is a top view of a disc drive 100, also referred to herein as a data storage device, constructed in accordance with preferred embodiments of the present invention. Numerous details of and variations for the construction of the disc drive 100 are not included in the following description as such are well-known to those skilled in the art, and believed unnecessary for the purpose of describing the present invention.

The disc drive 100 includes a basedeck 102 supporting various data storage device components, including a spindle motor assembly 104 that supports one or more axially aligned rotatable discs 106 forming a disc stack 108, each disc 106 having at least one, and usually two, recording surfaces 109.

Adjacent the disc stack 108 is a head stack assembly 110 (also referred to as an actuator assembly) that pivots about a bearing assembly 112 in a rotary fashion. The head stack assembly 110 includes an actuator arm 114 that supports a load arm 116, which in turn supports a read/write head 118 corresponding to the rotatable recording surface 109. The rotatable recording surface 109 is divided into concentric information tracks 120 (only one depicted) over which the read/write head 118 is positionably located. The information tracks 120 support head position control information written to embedded servo sectors (not separately depicted). Between the embedded servo sectors are data sectors (not depicted) used for storing bit patterns or data. The read/write head 118 includes a reader element (not shown) offset radially and laterally from a writer element (not shown). The writer element writes data to the concentric information tracks 120 during write operations of the disc drive 100, while the reader element controls the positioning of the read/write head 118 relative to the concentric information tracks 120 during read operations of the disc drives 100.

The terms "servoing" and "position-controlling," as used herein, mean maintaining control of the read/write head 118 relative to the rotating recording surfaces 109 during operation of the disc drive 100. Servoing to or on the information track 120, the head stack assembly 110 is controllably positioned by a voice coil motor assembly 122 (also referred to as a primary actuator motor). The voice coil motor assembly 122 includes an actuator coil 124 immersed in a magnetic field generated by a magnet assembly 126. A pair of steel plates 128 (pole pieces) mounted above and below the actuator coil 124 provides a magnetically permeable flux path for a magnetic circuit of the voice coil motor 122. During operation of the disc drive 100, current passes through the actuator coil 124 forming an electromagnetic field, which interacts with the magnetic circuit of the voice coil motor 122, causing the actuator coil 124 to move relative to the magnet assembly 126. As the actuator coil 124 moves, the head stack assembly 110 pivots about the bearing assembly 112, causing the read/write head 118 to move over the rotatable recording surface 109, thereby allowing the read/write head 118 to interact with the information tracks 120 of the recording surfaces 109.

To provide the requisite electrical conduction paths between the read/write head 118 and data storage device read/write circuitry (not shown), read/write head wires (not shown) of the read/write head 118 are affixed to a read/write flex circuit 130. The read/write flex circuit 130 is routed from the load arms 116 along the actuator arms 114 and into a flex circuit containment channel 132 and secured to a flex connector body 134. The flex connector body 134 supports the flex circuit 130 during passage through the basedeck 102 and into electrical communication with a printed circuit board assembly (PCBA, not shown) mounted to the underside of the basedeck 102. The flex circuit containment channel 132 also supports read/write signal circuitry including preamplifier/driver (preamp) 136 used to condition read/write signals passed between the read/write circuitry and the read/write head 118. The printed circuit board assembly provides the data storage device read/write circuitry that controls the operation of the read/write head 118, as well as other interface and control circuitry for the disc drive 100.

Figure 2:
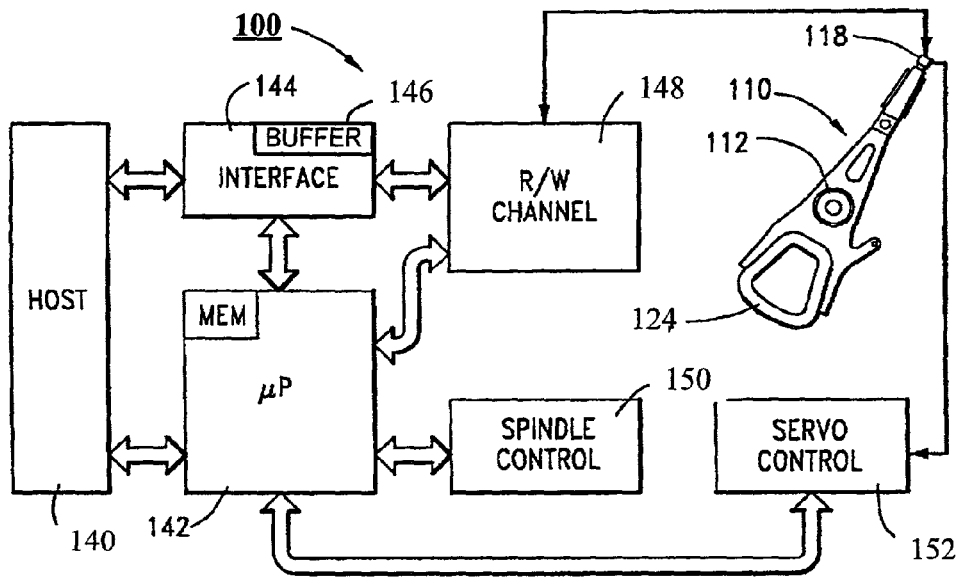
FIG. 2 provides a functional block diagram of the disc drive of FIG. 1 operably connected to a host computer in which the disc drive is coupled.

Turning to FIG. 2, shown therein is a functional block diagram of the disc drive 100 of FIG. 1, generally showing the main functional circuits which are resident on the printed circuit board assembly and used to control the operation of the disc drive 100.

The disc drive 100 is shown to be operably connected to a host device 140 in which the disc drive 100 is coupled in a conventional manner. Control communication paths are provided between the host device 140 and a disc drive microprocessor 142, the microprocessor 142 generally providing top level communication and control for the disc drive 100 in conjunction with programming stored in microprocessor memory (MEM) 143. The MEM 143 can include random access memory (RAM), read-only memory (ROM) and other sources of resident memory for the microprocessor 142.

Data is transferred between the host device 140 and the disc drive 100 by way of a disc drive interface 144, which includes a data buffer 146 for temporary storage of data to facilitate high speed data transfer between the host device 140 and the disc drive 100. Data to be written to the disc drive 100 is thus passed from the host device 140 to the interface 144 and then to a read/write channel 148, which encodes and serializes the data and provides the requisite write current signals to the read/write head 118. To retrieve data that has been previously stored by the disc drive 100, read signals are generated by the read/write head 118 and provided to the read/write channel 148, which performs decoding and error detection. Decoded or retrieved data is transferred to the interface 144 for subsequent transfer to the host device 140 while data errors are transferred to the microprocessor 142 to initialize error recovery routines. Such operation of the disc drive 100 is well known in the art and discussed, for example, in U.S. Pat. No. 5,276,662 issued Jan. 4, 1994 to Shaver et al., assigned to the assignee of the present invention.

The disc 106 is rotated by a spindle control circuit 150, which electrically commutates the spindle motor assembly 104 (FIG. 1) through the use of back electromotive force (bemf) sensing. Spindle control circuits such as represented at 150 are well known and are discussed, for example, in U.S. Pat. No. 5,631,999 issued May 20, 1997 to Dinsmore, assigned to the assignee of the present invention.

The radial position of the read/write head 118 is controlled through the application of current to the actuator coil 124 of the head stack assembly 110 and controlled by a servo control circuit 152.

Figure 3:
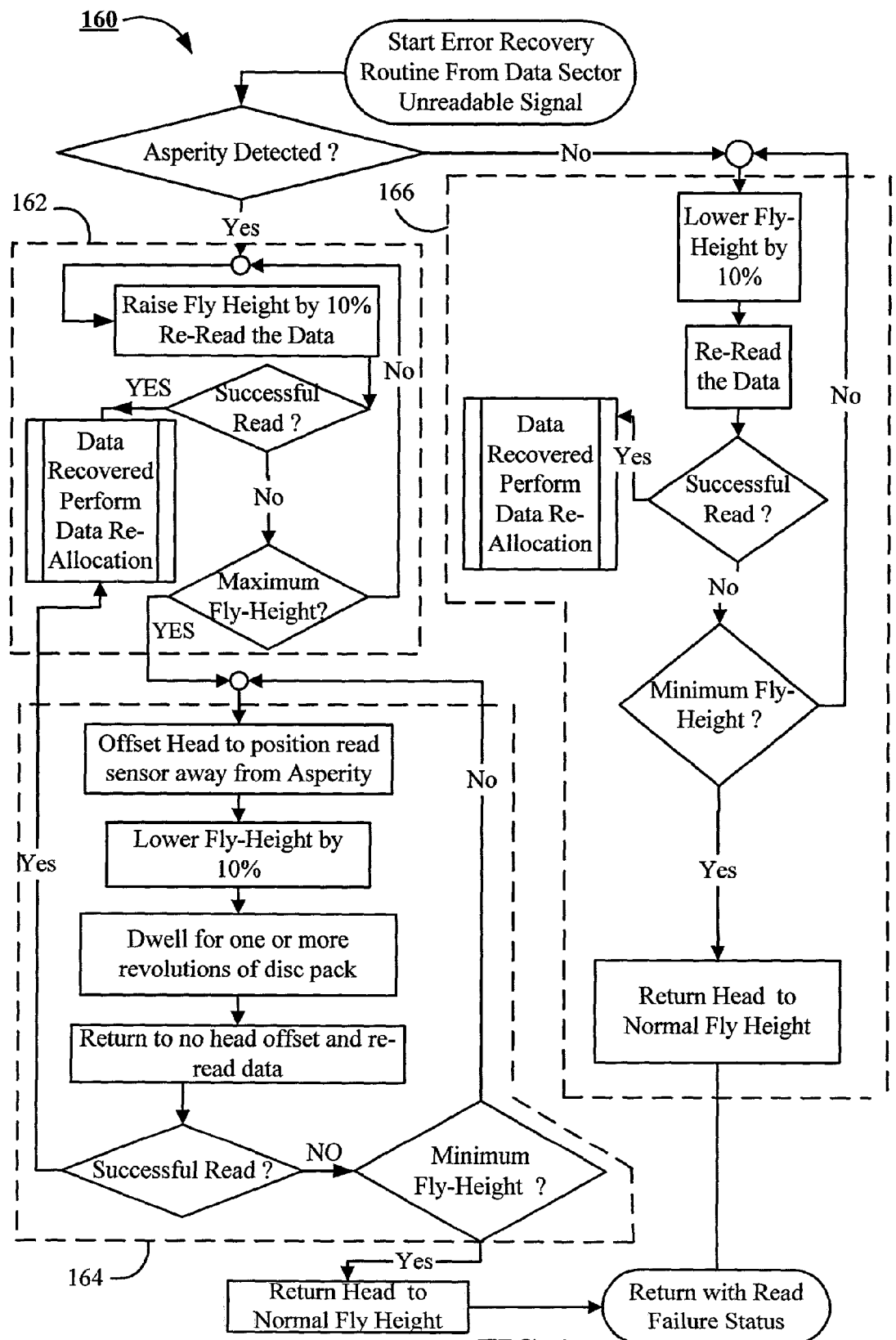
FIG. 3 provides a block diagram of the error recovery routine of the disc drive of FIG. 1.

FIG. 3 shows an error recovery routine 160 responsive to a data sector unreadable signal with three main portions. The first portion of the error recovery routine 160 is primary asperity generated data error recovery sub-routine 162, which is used as a first attempt in recovering data written to a data sector (not shown) of the information track 120. The second portion of the error recovery routine 160 is a secondary asperity generated data error recovery sub-routine 164, which is used as an alternate technique in recovering the data written to the data sector of the information track 120, if the primary asperity generated data error recovery sub-routine 162 is unsuccessful. The third portion of the error recovery routine 160 is a degraded read signal amplitude generated error recovery sub-routine 166, which is used for recovery of the data written to the sector of information track 120 that generates a low signal amplitude when read by the read/write head 118.

The error recovery routine 160 is initialized by receipt of a data sector unreadable signal generated by the read/write channel 148 of FIG. 2 when a data error, or an inability to recognize the data bits, occurs while reading the signal generated by the data written to the disc 106. An analysis is made to categorize the data error and corrective actions are taken by activating one or more of the three sub-routines of the error recovery routine 160. The analysis comprises a determination of the occurrence of an asperity event, i.e., amplitude of the read signal above a normal signal baseline established for the read/write channel 148 or amplitude of the read signal below the normal signal baseline. An asperity event typically displays a hallmark signature in the read signal of a sudden increase in amplitude of the read signal relative to a normal signal baseline followed by a decaying portion.

In response to detection of an asperity event, the primary asperity generated data error recovery sub-routine 162 is executed by the error recovery routine 160. In sub-routine 162, the fly height of the read/write head 118 is raised by 10% and the data is re-read, if successful the data is reallocated. If the data is not successfully read the fly height of the read/write head 118 is raised an additional 10% and an additional attempt is made to recover the data. The sub-routine 162 loops until the data is recovered or a maximum fly-height of the read/write head 118 is reached. If the maximum fly height of the read/write head is reached prior to recovery of the data, the error recovery routine 160 initiates the secondary asperity generated data error recovery sub-routine 164.

Several methods for adaptively altering fly heights of a read/write head have recently been made known in the art. One such method is discussed in U.S. Pat. App. No. 2001/0046108 A1, published on Nov. 29, 2001 titled "Fly Height Control Slider With Crown And Cross Curve De-Coupling" by Lewis et al. and assigned to the assignee of the present invention. In essence, Lewis teaches an attachment of a pair of piezoelectric beams to the back of the read/write head 118. Changing the shape of the piezoelectric beams by controllably altering current, or voltage (depending on the application and control mechanism) through the piezoelectric material beams alters the fly height of the read/write head 118. However, the technique selected for adaptively controlling the fly height of the read/write head does not pose a limitation on an incorporation of the present invention within a data storage product.

Sub-routine 164 signals the servo control circuit 152 to offset the reader element from track center of the information track 120, to reduce the possibility of impact between the reader element of the read/write head 118 and the asperity. The read/write head 118 is used to burnish the asperity from the recording surface 109 by reducing the fly height of the read/write head 118 by 10%. The sub-routine 164 then directs a re-read of the data and if recovered, the data is re-allocated, if not, sub-routine 164 loops until the data is recovered or the fly height of the read/write head 118 is at a minimum. If the data is not recovered prior to attainment of the minimum fly height, a read failure status signal is sent to the microprocessor 142 by the error recovery routine 160.

When the data sector unreadable signal is accompanied by an amplitude of the read signal falling below the normal signal baseline, the error recovery routine 160 executes sub-routine 166. The fly height of the read/write head 118 is lowered by 10% and the data is re-read, if successful the data is reallocated. If the data is not successfully read the fly height of the read/write head 118 is lowered an additional 10% and an additional attempt is made to recover the data. The sub-routine 166 loops until the data is recovered or a minimum fly-height of the read/write head 118 is reached. If the data is not recovered prior to attainment of the minimum fly height, a read failure status signal is sent to the microprocessor 142 by the error recovery routine 160.

Figure 4:
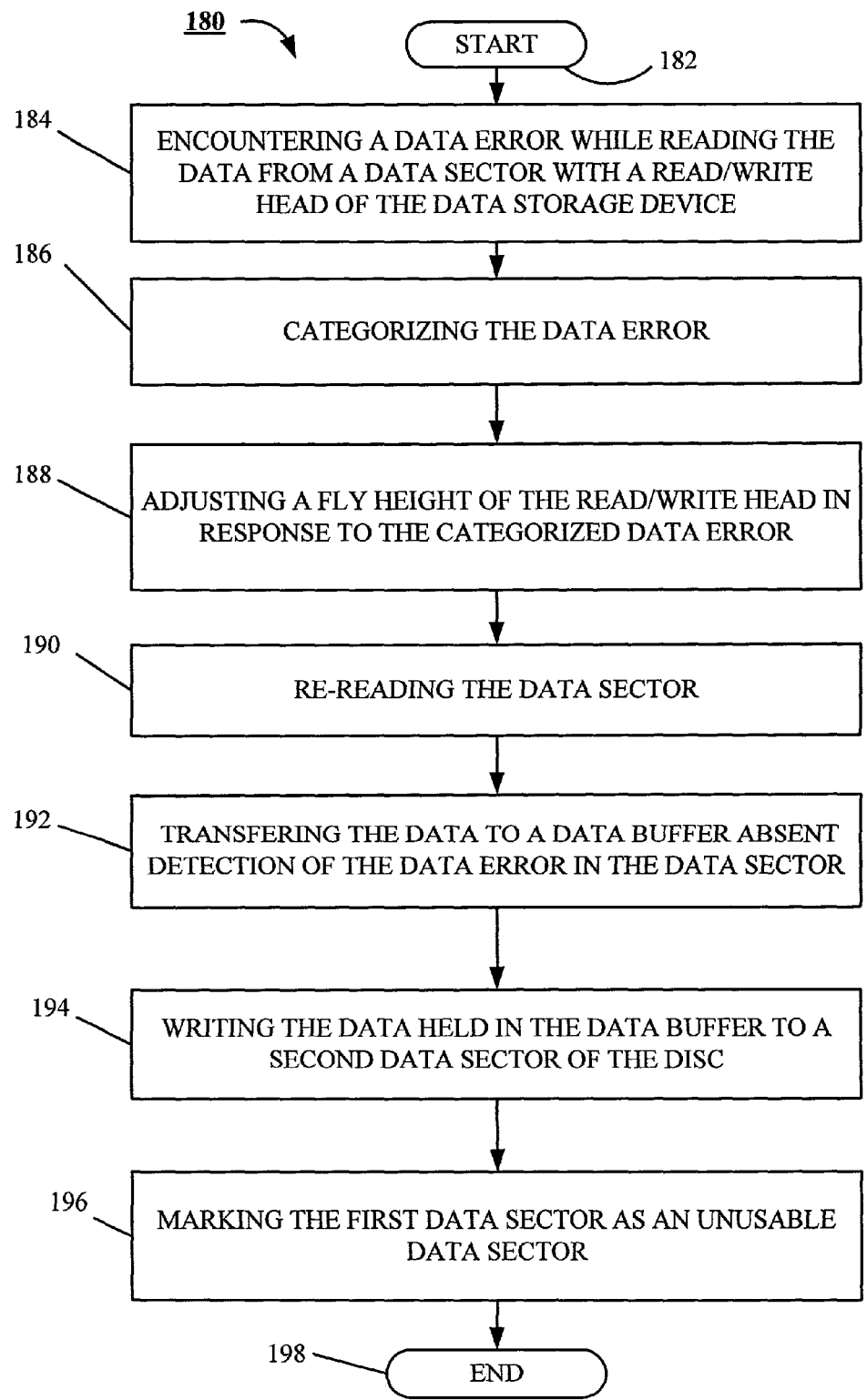
FIG. 4 is a flow chart of a method for recovering data recorded in a first data sector of a disc of the disc drive of FIG. 1.

FIG. 4 shows a data recovery process 180 for recovering data recorded to a first data sector of a disc, such as 106, of a disc drive, such as 100. The data recovery process 180 begins at start step 182 and continues with process step 184. At process step 184, an encountering of a data error while reading the data from a data sector with a read/write head, such as 118, initiates the data recovery process 180. In process step 186, the data error is categorized to permit a selection of data recovery sub-routine, such as 162,164 or 166. Sub-routine 162 and 164 address data errors that result from a read signal with an amplitude that is above a normal signal baseline relied on by the read/write channel 148 to decode the read signal. Sub-routine 166 addresses data errors that result from a read signal with an amplitude below the normal signal baseline relied on by the read/write channel 148 to decode the read signal. Adaptively altering the fly height of the read/write head 118 in response to read signal with an amplitude outside a range of the normal signal baseline promotes recovery of data from the data track 120 thereby improving the reliability of the disc drive 100.

During process step 188, adjustments to a fly height of the read/write head 118 are made in response to the categorization of the data error. If the data error is a result of an encounter wit an asperity, the fly height of the read/write head 118 is raised as a first attempt in recovering the data. If recovering the data is unsuccessful by raising the fly height of the read/write bead 118, a reader clement of the read/write head 118, which is positioned at a track center of the first data sector while reading the data, is offset or moved away from the track center of the first data sector. With the reader element offset from the track center of the first data sector, the fly height of the read/write head 118 is lowered, and the read/write head 118 burnishes the asperity. Once the asperity is burnished, the read/write head 118 is raised to a data transfer fly height, the reader element is repositioned over the track center of the first data sector and the recovery of the data is again attempted. If the data error is a result of a low amplitude signal generated byte data written to the first data sector, the fly height of the read/write head 118 is lowered by a predetermined amount, typically by about 10% of the data transfer fly height, and the first data sector is re-read. If the data recorded to the first data sector remains un-recovered, the fly height of the read/write head 118 is sequentially lowered and the data written to the first data sector is re-read with each lowering of the fly height until the data is recovered or a minimum fly height of the read/write head 118 is attained.

At process step 190 of the data recovery process 180, the data recorded to the data sector is re-read. If no data error is detected during the re-read of the data recorded to the first sector, the re-read data is sent to a data buffer, such as 146, in process step 192. In process step 194, the data held in the data buffer is rewritten to a second sector of the disc, and in process step 196, the data sector in which the data error was encountered is marked as unusable for future data storage. Once this is achieved, the end step 198 concludes the process.

Figure 5:
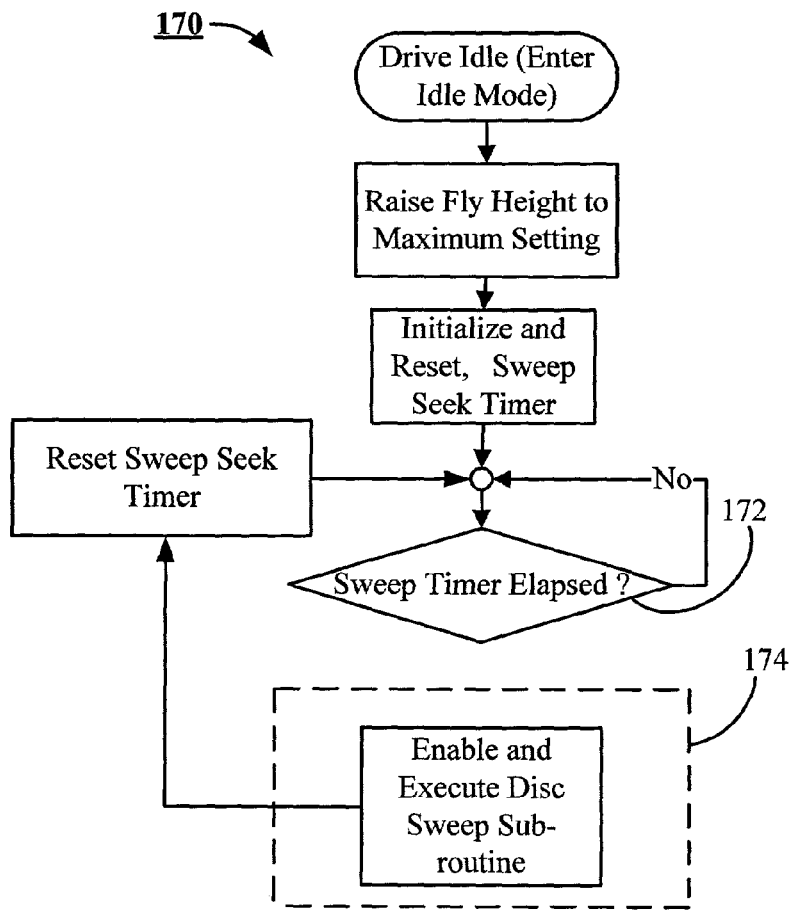
FIG. 5 provides a block diagram of the fly height adjusted sweep cycle routine of the disc drive of FIG. 1.

FIG. 5 shows a fly height adjusted sweep cycle routine 170 that uses a sweep elapse time query step 172 as a loop to maintain the read/write head 118 at a maximum fly height to minimize wear between the read/write head 118 and the recording surface 109 of the disc 106. The fly height adjusted sweep cycle routine 170 also uses a disc sweep sub-routine 174 to remove debris from the recording surface 109 and the read/write head 118 during periods of time the disc drive 100 is unoccupied with data transfer functions.

For every disc drive, a fly height of a read/write head relative to a recording surface of a disc is specified for the disc drive. The specified fly height for the read/write head relative to the disc is referred to as a data transfer fly height or the operating fly height. The data transfer fly height is selected to maximize the effectiveness and efficiency of writing data to and reading data from the recording surface of the disc. The data transfer fly height is the height the reader element of the read/write head is positioned from the recording surface during data transfer operations. The microprocessor 142 executes the fly height adjusted sweep cycle routine 170 during idle periods, i.e., periods that the disc drive 100 is unoccupied with data transfer functions. Routine 170 controls raising the fly height of the read/write head to a maximum fly height, sets an internal software timer represented by elapse time query step 172 and holds the read/write head at the maximum fly height until expiration of the timer. Upon expiration of the software timer, routine 170 executes the disc sweep sub-routine 174 by instructing the servo controller 152 to position the read/write head 118 at an inner most data track 120. With the read/write head 118 positioned at the inner most data track 120, the fly height of the read/write head 118 is lowered to substantially 30% above the minimum fly height of the read/write head 118. Then, the servo controller is directed to re-position the read/write head 118, also referred to as seeking to an outer most data track of the recording surface 109 to "sweep" the recording surface 109. The rate and profile of the seek is empirically optimized for disc drives of different types.

Upon reaching the outer most data track of the recording surface 109, the sub-routine 174 directs the fly height of the read/write head 118 to be raised to the maximum fly height While at the maximum fly height any debris collected on the read/write bead 118 during the sweep of the recording surface 109 is "shaken off" by engaging in a plurality of short seeks that trigger an oscillation of the read/write head 118. The sub-routine loops by resetting the internal software following the shake off of the debris from the read/write head 118 until the microprocessor 142 conducts a data transfer operation.

Figure 6:
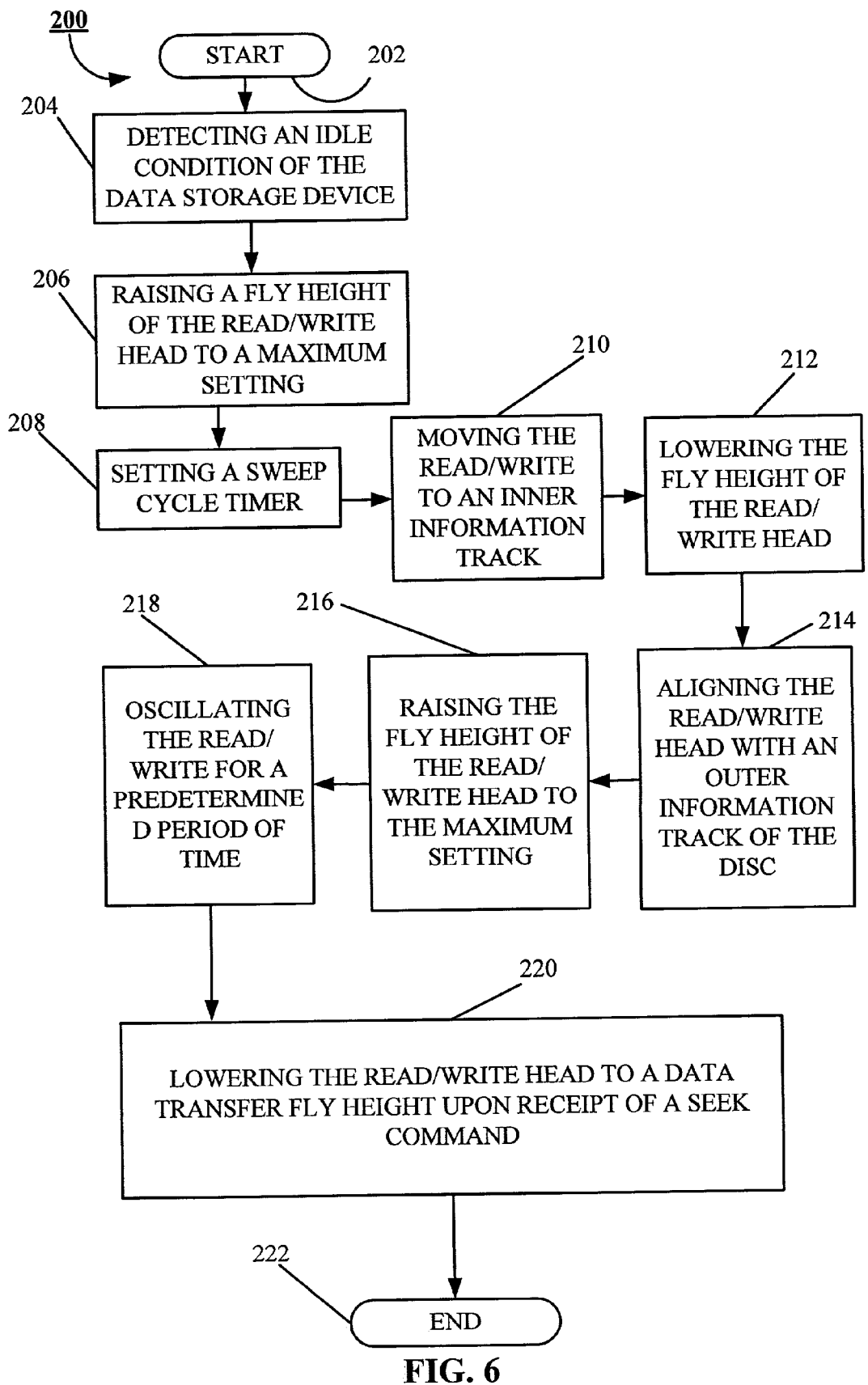
FIG. 6 is a flow chart of a method for reducing wear between the disc and a read/write head of the disc drive of FIG. 1.

FIG. 6 shows a wear reduction process 200 for reducing wear between the disc 106 and the read/write head 118. The wear reduction process 200 begins at start step 202 and continues with process step 204. At process step 204, an idle condition of the disc drive 100 is detected. The term idle condition for the disc drive means the disc drive is unoccupied with data transfer operations, leaving the disc stack 108, available for maintenance tasks accomplished with the head stack assembly 110. One such maintenance task is removal of debris generated during disc drive operations. A technique used for removal of the debris is a sweep cycle. After detecting a drive idle condition and prior to entering the sweep cycle, the fly height of the read/write head 118 is raised to a maximum setting at process step 206. In process step 208 a sweep cycle time is set and the read/write head 118 is moved to the inner information track 120, at process step 210.

Process step 212 continues the wear reduction process 200 by lowering the fly height of the read/write head 118, typically to a substantial amount such as thirty percent above a minimum fly height for the read/write head 118. With the read/write head 118 at the lowered position, the read/write head 118 is moved to an outer track of the disc drive in process step 214. Movement from the inner track to the outer track of the disc may be accomplished in a variety of ways. Generally, each information track between the inner information track and the outer information track is dwelled on for a predetermined period of time. The dwell time can be less than the time for one revolution of the disc spinning at a constant rotational velocity operating speed, or the dwelled time can be as long as a number of rotations of the disc at the constant rotational velocity operating speed of the disc drive.

Once the read/write head 118 has reached the outer information track, the fly height of the read/write head 118 is raised to a maximum setting in process step 216. At process step 218, with the read/write head 118 raised to its maximum setting, the read/write head 118 is oscillated to dislodge debris collected on the read/write head 118 while moving from the inner track to the outer track. Oscillation of the read/write head 118 is typically accomplished through execution of a predetermined number of short seeks. The read/write head 118 remains at the maximum fly height setting until a seek command is received. Upon receipt of the seek command the read/write head 118 is lowered to a data transfer fly height by process step 220. Once this is achieved, the end step 222 concludes the process and the seek command is executed.

Accordingly, the present invention is directed to a method for reducing wear between a disc (such as 106) and a read/write head (such as 118) of a data storage device (such as 100) to improve a reliability of the data storage device. In accordance with one embodiment, the method includes the steps of detecting an idle condition of the data storage device (such as step 204), raising a fly height of the read/write head to a maximum setting (such as step 206), setting a sweep cycle timer (such as 208), moving the read/write to an inner information track (such as step 210), lowering the fly height of the read/write head (such as step 212), aligning the read/write head with an outer information track of the disc (such as step 214), raising the fly height of the read/write head to the maximum setting (such as step 216), oscillating the read/write for a predetermined period of time (such as 218) and lowering the read/write head to a data transfer fly height upon receipt of a seek command (such as step 220) are accomplished to improve reliability of the data storage device.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A method comprising:
   raising a fly height of a transducer to a maximum setting at a radial position;
   moving the transducer unidirectionally while substantially at the maximum fly height to a beginning position; and
   lowering the transducer to a minimum fly height at the beginning position and executing a move cycle routine moving the transducer unidirectionally away from the beginning position while remaining substantially at the minimum fly height.

2. A data storage device comprising:
   a transducer and a storage medium positionable along two dimensions with respect to each other in a data transfer relationship; and
   a control element executing a move cycle routine by steps for associating a spatial separation between the transducer and the storage medium in relation to a direction of moving the transducer across the storage medium.

3. The data storage device of claim 2, in which the steps for associating are characterized by moving the transducer to a beginning position of a move cycle while at a fly height that is greater than a nominal fly height.

4. The data storage device of claim 3, in which the steps for associating are characterized by executing the move cycle with the transducer at a fly height that is less than the nominal fly height.

5. The data storage device of claim 4, in which the steps for associating are characterized by the move cycle moving the transducer from an innermost portion to an outermost portion of the storage medium while at a fly height that is less than the nominal fly height.

6. The data storage device of claim 5, in which the steps for associating are characterized by the transducer dwelling at each of a plurality of data storage tracks during the move cycle.

7. The data storage device of claim 6 wherein the steps for associating are characterized by the transducer dwelling at a selected data storage track for less than one complete revolution of the data storage track during the move cycle.

8. The data storage device of claim 6 wherein the steps for associating are characterized by the transducer dwelling at a selected data storage track for at least one complete revolution of the data storage track during the move cycle.

9. The data storage device of claim 5 wherein the steps for associating are characterized by oscillating the transducer while at a fly height that is greater than the nominal fly height subsequent to completing the move cycle.

10. The data storage device of claim 5 wherein the steps for associating are characterized by moving the transducer to the nominal fly height subsequent to completing the move cycle.

11. An apparatus comprising circuitry configured to spatially separate a transducer from a storage medium by a first separation that is greater than a nominal data transfer separation, to thereafter move the transducer adjacent a selected portion of the storage medium at the first separation, to thereafter lower the transducer to a second separation that is less than the nominal data transfer separation, and to thereafter move the transducer across the storage medium at the second separation.

12. The apparatus of claim 11 wherein the circuitry is configured such that the first separation is associated with a maximum operable data transfer separation.

13. The apparatus of claim 12 wherein the circuitry is configured such that the second separation is associated with a minimum operable data transfer separation.

14. The apparatus of claim 13 wherein the circuitry is configured such that the second separation is substantially thirty percent greater than the minimum operable data transfer separation.

15. The apparatus of claim 13 wherein the circuitry is configured such that the transducer seeks from an outer track to an inner track of a rotating disc data storage medium at the first separation.

16. The apparatus of claim 15 wherein the circuitry is configured such that the transducer seeks from the inner track to an outer track of the rotating disc data storage medium at the second separation.

17. The apparatus of claim 16 wherein the circuitry is configured further to move the transducer from the second separation to the first separation subsequent to seeking to the outer track.

18. The apparatus of claim 17 wherein the circuitry is configured further to oscillate the transducer at the first separation subsequent to seeking to the outer track.

19. The apparatus of claim 18 wherein the circuitry is configured to oscillate the transducer by a series of short seeks.

20. The apparatus of claim 16 wherein the circuitry is configured further to move the transducer from the second separation to the nominal separation subsequent to seeking to the outer track.

* * * * *